Patented Feb. 15, 1927.

1,618,047

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

METHOD OF TREATING CALCIUM CYANAMID.

No Drawing.     Application filed December 29, 1923. Serial No. 683,373.

This invention relates to a method of treating crude calcium cyanamid, to transform its contained nitrogen into a condition of greater value as a fertilizer, and at the same time facilitate its introduction into the ordinary mixed fertilizers of commerce. Calcium cyanamid is a compound subject to chemical decomposition of several natures; and while certain of its decomposition products are extremely valuable fertilizer materials, others are of less value, and some of little or no value.

The object of the invention is to so treat the cyanamid material as to direct its decomposition along the lines of producing the more valuable fertilizer compounds, and hindering the development of the less valuable ones. With these and other objects in view the invention consists in the various steps and combinations of steps constituting the process, all as will be more fully hereinafter described and particularly pointed out in the claims.

As an example of the process, one may take 100 parts of finely ground calcium cyanamid and agitate it with approximately 200 parts of water. The slurry may be very thoroughly mixed and then stored. One may then introduce said slurry into an acidulating pan, such as is in common use among fertilizer manufacturers, containing say 900 parts of 60 degree Bé. sulphuric acid, and as soon as this mixture is stirred in one may add approximately 1000 parts of ground phosphate rock and rapidly agitate the whole till the mass has reacted. The mixture is then discharged into a den or chamber in which the reaction is allowed to go to completion and the material to set or harden.

It is customary to employ 52 degrees Bé. sulphuric acid in such procedures, but I have chosen the stronger acid in this case to offset the diluting effect of the water incorporated with the calcium cyanamid. The use of the stronger acid serves a two-fold purpose; it dispenses with the usual diluting of the sulphuric acid from 60 degrees Bé., which is the strength in which it reaches the manufacturer in the tank-car, to 52 degrees Bé., which he usually employs, and it also uses up the excess of water introduced with the calcium cyanamid.

By conducting the operation in the way just disclosed, I completely decompose the cyanamid, the bulk of the decomposition product being urea, and the remainder very largely sulphate of ammonia. I avoid the formation of dicyandiamid, dicyandiamidine, dicyandiamidine sulphate, and similar compounds which are less desirable in fertilizer mixtures.

On the other hand, when commercial cyanamid is thrown directly into sulphuric acid in a mixing pan the larger particles coat themselves over with a porous layer of calcium sulphate on first contact with the diluted sulphuric acid. The water present, after the acid has been neutralized by the lime, soaks into the core of the said particle and being quite hot from the reaction tends to convert the centre of the lump into dicyandiamid and its above mentioned related compounds.

But, of even greater importance is the fact that commercial calcium cyanamid from its method of manufacture and preparation tends to adhere together in masses and the mass itself behaves like a large particle, but in an exaggerated degree.

It therefore constitutes an important feature of this invention that the commercial calcium cyanamid is first mixed with water before reacting with the acid, for the solution reacts so quickly that the above mentioned objectionable compounds are not formed.

It follows that the mixing operation now employed in fertilizer pans while effective enough for the production of acid phosphate, is not sufficiently active chemically to properly bring forth the desired reactions between the calcium cyanamid and the acids or other reagents employed. This imperfect mixing operation, however, can be corrected by the manipulation to be described. That is according to this invention, if one makes a slurry of the calcium cyanamid, he gets practically an instantaneous contact between the whole of the calcium cyanamid present and the sulphuric acid or other re-agent in the ordinary acidulating pan. Under these conditions by far the larger part of the crude calcium cyanamid is converted to urea and there is very little of the less desirable compounds formed.

The addition of water to the acid in the form of a calcium cyanamid slurry is not a serious disadvantage in the mixing operation because the usual sulphuric acid charged into the pan contains about 35% of water, whereas the commercial grades produced in a well operated sulphuric acid plant, or that commonly found in commerce and shipped in tank cars contains only about 22% of water. In using a stronger acid, where such is found necessary to insure a proper condition of the finished fertilizer, I therefore make use of the regular article and avoid the necessity of dilution which is a usual step of acid phosphate manufacture. This water, which I have added with the calcium cyanamid is readily taken care of by using the commercial acid.

It is preferred to use sufficient water to make a slurry, but a less quantity of water will also produce advantageous results.

Common practice may vary the addition to the pan so that rock may precede the calcium cyanamid into the acid, or the two may go in simultaneously, or the calcium cyanamid may precede the rock without departing from the invention.

Practically all mixed fertilizers contain as an important constituent acid phosphate, a material made by treating phosphate rock with sulphuric acid. Cyanamid contains considerable quantities of lime, and if added in excessive amounts to acid phosphate it tends to neutralize the free acid as well as the acid phosphate, and to render the phosphates more or less insoluble. The direct addition of commercial calcium cyanamid is, therefore, limited by this neutralizing action, and its usage, mainly, is limited to those fertilizers having a maximum number of pounds per ton of acid phosphate, if the formation of insoluble phosphates is to be avoided.

This invention avoids this limiting quantity of crude cyanamid which may be added to acid phosphate fertilizers, for it converts the cyanamid into valuable fertilizer constituents. In addition, this invention also simplifies the operation of incorporating the cyanamid with the other fertilizer constituents and so tends to reduce the cost of production of the fertilizer.

It is obvious that those skilled in the art may vary the details of the process without departing from the spirit of the invention, and therefore, I do not wish to be limited to the above disclosure except as may be required by the claims.

What I claim is:—

1. The method of controlling the decomposition products when commercial calcium cyanamid is brought into contact with a reagent, which consists in treating said cyanamid with liquid capable of preventing its particles from adhering to each other and reacting on the mixture with an acid.

2. The method of treating commercial calcium cyanamid to form a fertilizer constituent which consists in forming a slurry of said cyanamid with water and reacting on the slurry with an acid.

3. The method of making a fertilizer constituent from commercial calcium cyanamid which consists in making a slurry of said cyanamid with water, and reacting on said slurry with sulphuric acid.

4. A method of treating a powdered compound formed on combining nitrogen with calcium carbide, which comprises mixing it with a liquid capable of overcoming the adhesion between the particles of the powdered solid and also capable of acting as a carrier for the reagent on adding sulphuric acid.

5. A method of treating commercial calcium cyanamid which comprises adding substantially 200 parts of water to 100 parts of said calcium cyanamid to form a slurry, and stirring the mass into 900 parts of 60 degree Bé. sulphuric acid.

6. A method of treating commercial calcium cyanamid which comprises adding substantially 200 parts of water to 100 parts of powdered calcium cyanamid to form a slurry; stirring this into 900 parts of 60 degree Bé. sulphuric acid; stirring in 1000 parts ground phosphate rock, and discharging the mass into a den to set.

7. A method of treating commercial calcium cyanamid which comprises adding water to powdered calcium cyanamid to form a slurry; stirring this into sulphuric acid; stirring in ground phosphate rock and discharging the mass into a den to set.

In testimony whereof I affix my signature.

GEORGE BARSKY.